United States Patent
Hodgkins et al.

(10) Patent No.: US 12,077,445 B2
(45) Date of Patent: Sep. 3, 2024

(54) METHOD FOR MANUFACTURE OF A MODIFIED ZSM-5 ZEOLITE IN THE PRESENCE OF ODSO

(71) Applicant: SAUDI ARABIAN OIL COMPANY, Dhahran (SA)

(72) Inventors: Robert Peter Hodgkins, Dhahran (SA); Omer Refa Koseoglu, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 381 days.

(21) Appl. No.: 17/493,206

(22) Filed: Oct. 4, 2021

(65) Prior Publication Data
US 2023/0108772 A1    Apr. 6, 2023

(51) Int. Cl.
C01B 39/40    (2006.01)
(52) U.S. Cl.
CPC .......... *C01B 39/40* (2013.01); *C01P 2002/02* (2013.01); *C01P 2002/72* (2013.01); *C01P 2004/03* (2013.01)
(58) Field of Classification Search
CPC .. C01B 39/40; C01P 2002/02; C01P 2002/72; C01P 2004/03
See application file for complete search history.

(56) References Cited

U.S. PATENT DOCUMENTS

| 3,313,594 | A | 4/1967 | Wilson, Jr. |
| 3,516,786 | A | 6/1970 | Maher et al. |
| 5,763,720 | A * | 6/1998 | Buchanan ............ B01J 29/7476 585/475 |
| 6,337,063 | B1 | 1/2002 | Rouleau et al. |
| 7,923,522 | B2 | 4/2011 | Hamada et al. |

FOREIGN PATENT DOCUMENTS

WO    2019224082 A1    11/2019

OTHER PUBLICATIONS

Jo, Changbum & Lee, Sungjune & Cho, Sung & Ryoo, Ryong. (2015). Synthesis of Silicate Zeolite Analogues Using Organic Sulfonium Compounds as Structure-Directing Agents. Angewandte Chemie International Edition.

* cited by examiner

*Primary Examiner* — Colin W. Slifka
*Assistant Examiner* — Logan Edward Laclair
(74) *Attorney, Agent, or Firm* — Leason Ellis LLP

(57) ABSTRACT

A method for the preparation of a zeolite having MFI framework is provided that advantageously utilizes as a component oxidized disulfide oil, for example derived from a waste refinery stream of disulfide oil. The MFI framework zeolite is formed from an aqueous mixture of an aluminum source, a silica source, oxidized disulfide oil, an alkali metal source and a structure directing agent, which is heated under conditions and for a time effective to form the MFI framework zeolite.

19 Claims, 6 Drawing Sheets

METHOD FOR MANUFACTURE OF A MODIFIED ZSM-5 ZEOLITE IN THE PRESENCE OF ODSO

RELATED APPLICATIONS

Not applicable.

BACKGROUND OF THE INVENTION

Field of the Invention

The present invention relates to a method of making a modified ZSM-5 zeolite silica-alumina composition.

Description of Related Art

Hundreds of natural and synthetic zeolite framework types exist, and have many different applications. Zeolites are generally hydrated aluminum silicates that can be made or selected with a controlled porosity and other characteristics. Certain types of zeolites find application in various processes in petroleum refineries. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components.

ZSM-5 zeolites are a type of zeolite having a MFI framework, an orthorhombic structure and belonging to the pentasil family. The general formula is $Na_nAl_nSi_{96-n}O_{192} \cdot 16H_2O$ ($0<n<27$)). ZSM-5 zeolites have pore dimensions that results in the formation of channels of suitable size and shape for selective passage for xylene isomers. For example, in a mixture of p-, o- and m-xylenes, p-xylene readily passes through the channels of ZSM-5 catalysts due to its linear configuration, while diffusion of o-xylene and m-xylene is hindered.

Methods for preparing ZMS-5 are known. For example, U.S. Pat. No. 3,702,886, the entire contents of which are incorporated herein by reference, discloses a process for preparing ZSM-5 using a mixture of alkali metal cations and tetraalkylammonium cations, such as tetrapropylammonium (TPA) cations as a template or structure directing agent to direct the synthesis of the ZSM-5 structure. Numerous variations of this method are known, and it is appreciated that the physical and catalytic properties of the ZSM-5 can be highly dependent upon the method by which it is manufactured.

ZSM-5 zeolites have the characteristics listed in Table 1 below.* A person skilled in the art will recognize that unit cell parameters can vary slightly depending on framework composition such as the silica-to-alumina ratio (SAR).

TABLE 1

| Idealized cell data a, b and c parameters (Å) | Crystal chemical data a, b and c parameters (Å) | Number of T atoms in unit cell | Composite building units | Framework density | Member ring size | Channel size [100] (Å) | Channel size [010] (Å) |
|---|---|---|---|---|---|---|---|
| 20.1, 19.7, 13.1 | 20.07, 19.92, 13.42 | 96 | mor, cas, mel, mfi | 17.9 T/1000 Å$^3$ | 10 | 5.1 × 5.5 | 5.3 × 5.6 |

*Data obtained from Olson, D. H., Kokotailo, G. T., Lawton, S. L. and Meier, W. M. J. Phys. Chem., 85, 2238-2243 (1981) for the Crystal chemical data column.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. The catalyst can be a homogeneous water-soluble compound that is a transition metal containing an active species selected from the group consisting of Mo (VI), W (VI), V (V), Ti (IV), and combinations thereof.

The ODSO stream so-produced contains ODSO compounds as disclosed in U.S. Pat. No. 10,781,168 as a solvent (in general), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and to simplify their environmentally acceptable disposal, and to utilize the modified products in an economically and environmentally friendly manner, and thereby enhance the value of this class of by-products to the refiner.

Despite the known ways to produce ZSM-5 zeolites, there remains a need in the art for improved methods to produce zeolite materials, in particular using DSO by-products in an economically and environmentally friendly manner.

SUMMARY

A method for the preparation of a zeolite having MFI framework is provided that advantageously utilizes as ODSO a component, for example derived from a waste refinery stream of disulfide oil. The MFI framework zeolite is formed from an aqueous mixture of an aluminum source, a silica source, water soluble ODSO, an alkali metal source and a structure directing agent. The aqueous mixture is heated under conditions and for a time effective to form the MFI framework zeolite.

In certain embodiments of the present disclosure, the method for synthesizing MFI framework zeolite comprises: forming an aqueous mixture of an aluminum source, a silica source, water soluble ODSO, an alkali metal source and a structure directing agent; heating the mixture under conditions and for a time effective to form a crystalline zeolite as a precipitate suspended in a supernatant as an intermediate suspension; recovering the precipitate from the intermediate suspension; and calcining the recovered precipitate is calcined at a suitable temperature, temperature ramp rate and for a suitable period of time at to realize porous MFI framework zeolite.

In certain embodiments, the intermediate suspension has a pH of greater than about 9, for example in the range of about 9-14. In certain embodiments, the alkali metal source is sodium and the mass ratio of ODSO to sodium is less than about 9, for example in the range of about 0.01-9. In certain embodiments, the recovered porous MFI framework zeolite has a silica-to-alumina ratio in the range of about 20-1500.

The aluminum source comprises aluminates, alumina, other zeolites, aluminum colloids, boehmites, pseudo-boehmites, aluminum hydroxides, aluminum salts, aluminum alkoxides or alumina gels. The silica source comprises sodium silicate (water glass), fumed silica, precipitated silica, colloidal silica, silica gels, zeolites, dealuminated zeolites, silicon hydroxides or silicon alkoxides. The structure directing agent comprises quaternary ammonium cation compounds, bifunctional dicationic molecules containing a long aliphatic chain, dual-porogenic surfactants, silylated polyethylenimine polymers, amphiphilic organosilanes, or hydrophilic cationic polyelectroyltes/polymers. In certain embodiments, the structure directing agent can comprise quaternary ammonium cation compounds selected from the group consisting of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds, and combinations thereof. In certain embodiments, the structure directing agent comprises bifunctional dicationic molecules selected from the group consisting of $C_{22-6-6}$, $C_{22-6-3}$, and poly(ethylene glycol).

In the above methods, the ODSO compounds can include 3 or more oxygen atoms; have 1 to 20 carbon atoms; have an average density greater than about 1.0 g/cc; and/or have an average boiling point greater than about 80° C. In certain embodiments the ODSO compounds are selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' can be the same or different C1-C10 alkyl or C6-C10 aryl.

In the above methods, the homogeneous aqueous mixture can be formed by providing the silica source; and, combining with the silica source, the aluminum oxide source, the alkali metal source and the structure directing agent, and the water soluble ODSO. The water soluble ODSO can be added after the aluminum oxide source, the alkali metal source, and the structure directing agent, or the water soluble ODSO can first be combined with the aluminum oxide source, the alkali metal source and the structure directing agent, and then the resulting mixture combined with the silica source.

In the above methods, the homogeneous aqueous mixture can be formed by providing the aluminum oxide source, the alkali metal source and the structure directing agent as a first mixture; and combining the first mixture with the silica source and the water soluble ODSO. The water soluble ODSO can be added after the silica source; or the water soluble ODSO can first be combined with the silica source, and then the resulting mixture combined with the first mixture.

In the above methods, the homogeneous aqueous mixture can be formed by combining the water soluble ODSO with the silica source to form a first mixture; and combining with the first mixture the aluminum oxide source, the alkali metal source and the structure directing agent.

In the above methods, the homogeneous aqueous mixture can be formed by combining the water soluble ODSO with the aluminum oxide source, the alkali metal source and the structure directing agent to form a first mixture; and combining with the first mixture the silica source.

In the above methods, an effective quantity of water for the homogeneous aqueous mixture is provided by using a water-containing silica source, and/or by using an aqueous mixture of the aluminum oxide source, the alkali metal source and the structure directing agent.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1:
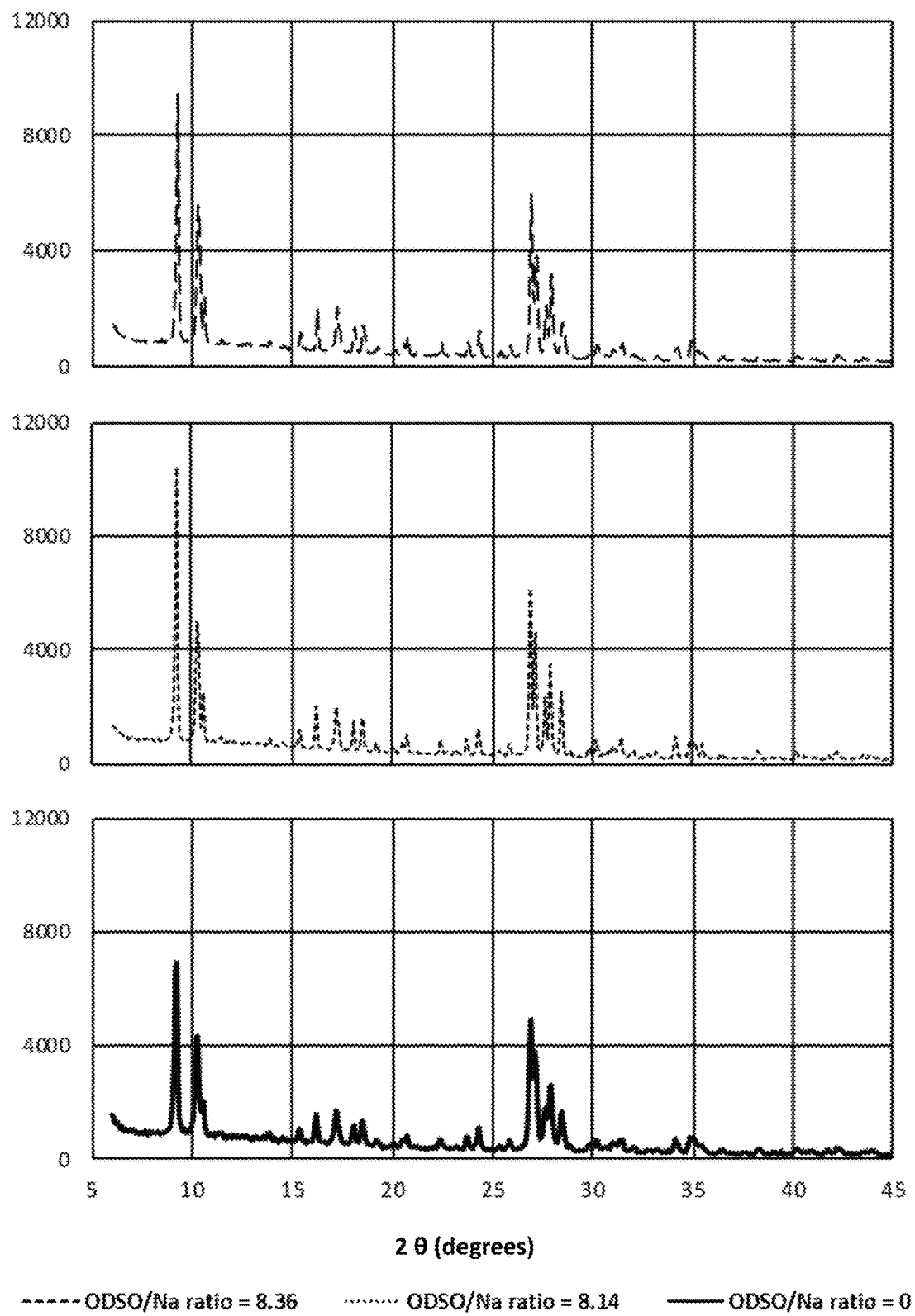
FIG. 1 shows X-ray diffraction patterns of calcined ZSM-5 zeolites synthesized using ODSO, wherein diffractograms are provided for different ratios of ODSO/Na.

Methods for the preparation of zeolites having MFI framework, such as a ZSM-5 zeolite, are provided. Effective quantities of water soluble ODSO, an aluminum source, a silica source, an alkali metal source, and a structure directing agent are formed as a homogeneous aqueous mixture. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate suspended in a supernatant. The precipitate is recovered, for example by filtration, washing and drying. The recovered precipitate is calcined at a suitable temperature, temperature ramp rate and for a suitable period of time at to realize porous ZSM-5 zeolite having MFI framework.

In certain embodiments, the homogeneous aqueous mixture is formed by: providing the silica source; combining the aluminum oxide source, the alkali metal source and the structure directing agent; and combining the water soluble ODSO. Alternatively, the water soluble ODSO is combined with the aluminum oxide source, the alkali metal source and the structure directing agent, and that mixture is combined with the silica source.

In certain embodiments, the homogeneous aqueous mixture is formed by: providing the aluminum oxide source, the alkali metal source and the structure directing agent as a mixture; combining the silica source; and combining the water soluble ODSO. Alternatively, the water soluble ODSO is combined with the silica source, and that mixture is combined with the aluminum oxide source, the alkali metal source and the structure directing agent.

In certain embodiments, the homogeneous aqueous mixture is formed by: combining the water soluble ODSO with the silica source to form a mixture; and that mixture is combined with the aluminum oxide source, the alkali metal source and the structure directing agent.

In certain embodiments, the homogeneous aqueous mixture is formed by: combining the water soluble ODSO with the aluminum oxide source, the alkali metal source and the structure directing agent to form a mixture; and that mixture is combined with the silica source.

The homogeneous aqueous mixture of the aluminum source, silica source, ODSO and structure directing agent, formed from any of the above chronological sequences of component addition, is heated under conditions and for a time effective to form a precipitate suspended in a supernatant. The precipitate is recovered, for example by filtration, washing and drying. The recovered precipitate is calcined at a suitable temperature, temperature ram rate and for a suitable period of time at to realize porous ZSM-5 zeolite.

An effective quantity of water for the aqueous environment compound can be provided by using a water-containing silica source such as colloidal silica, and/or by using an aqueous mixture of the aluminum oxide source, the alkali metal source and the structure directing agent. These components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume.

Certain ratios of materials are provided to attain the effective quantities of components. An effective SAR in the synthesized ZSM-5 includes but is not limited to ratios in the range of about 20-1500, 20-1000, 20-500, 25-1500, 25-1000, 25-500, 50-1500, 50-1000, 50-500, 100-1500, 100-1000 or 100-500. An effective amount of structure directing agent is used, for example at a molar ratio (normalized to 1 mole of $Al_2O_3$) in the range of about 0.1-75, 0.1-50, 0.1-30, 2.5-75, 2.5-50, 2.5-30, 5-75, 5-50 or 5-30. In addition, an effective amount of alkali metal is used so as to maintain a pH level of greater than or equal to about 9, for example in the range of about 9-14, 9-13, 10-14, 10-13, 11-14 or 11-13 in the intermediate suspension of the precipitate suspended in the supernatant. It is noted that in the process herein, the pH is reduced by the presence of ODSO, therefore, the quantity of the alkali metal source, such as sodium in the form of NaOH, can be adjusted accordingly to give the desired added to provide the desired pH. An effective mass ratio of ODSO/Na is less than or equal to about 9, for example in the range of about 0.01-9.

The aluminum source can comprise, without limitation, one or more of aluminates, alumina, other zeolites, aluminum colloids, boehmites, pseudo-boehmites, aluminum salts such as aluminum sulfate and alumina chloride, aluminum hydroxides and alkoxides, alumina gels. For example, suitable materials as aluminum sources are commercially available from Sasol, for instance high purity aluminas (CERALOX) and alumina hydrates (PURAL and CAPITAL), boehmites (DISPERSAL and DISPAL), and silica-alumina hydrates (SIRAL) and the corresponding oxides (SIRALOX).

The silica source can comprise, without limitation, one or more of silicates including sodium silicate (water glass), fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources are commercially from Cabot (for example, fumed silica) and Ludox (for example, colloidal silica).

Effective structure directing agents include one or more of quaternary ammonium cation compounds (including one or more of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds. The cation can be paired with one or more of a hydroxide anion (for example, TPAOH or CTAOH), a bromide anion (for example, TPAB or CTAB), or an iodide anion. In certain embodiments the structure directing agents include bifunctional dicationic molecules containing a long aliphatic chain (for example $C_{22}H_{45}$—$N^+$($CH_3$)$_2$—$C_6H_{12}$—$N^+$($CH_3$)$_2$—$C_6H_{13}$, denoted $C_{22-6-6}$, $C_{22}H_{45}$—$N^+$($CH_3$)$_2$—$C_6H_{12}$—$N^+$($CH_3$)$_2$—$C_3H_7$, denoted $C_{2-6-3}$, or a poly(ethylene glycol)), dual-porogenic surfactants, silylated polyethylenimine polymers, amphiphilic organosilanes, or hydrophilic cationic polyelectroyltes/polymers such as poly(diallyldimethylammonium chloride) (PDADMAC).

The disclosed process for synthesizing ZSM-5 can occur in the absence or presence of seed materials comprising zeolite structures such as ZSM-5 (MFI), ZSM-8 (MFI), ZSM-11 (MEL) and Silicalite-1 (MFI).

The disclosed processes for synthesizing ZSM-5 can occur in the presence of a mineralizer as the alkali metal source selected from the group consisting of NaOH, KOH, RbOH, LiOH, CsOH and combinations thereof. In certain embodiments a Na-based mineralizer is selected. Note that the alkali metal source is provide as a hydroxide, but in embodiments herein where the ratio is expressed based on the mass of the alkali, it is the metal itself. For instance, when the alkali is NaOH, the ODSO/Na ratio is determined by dividing the mass of the ODSO by the mass of the Na portion of NaOH, that is, about 57.5% of the NaOH mass.

The use of ODSO has the effect to modify the morphology of the ZSM-5 crystals (for example, increasing the epitaxial growth along the (100) direction, varying the ratio of the (101) to (001) planes, and increasing the length-to-diameter ratios), as described herein.

The use of ODSO has the effect to produce ZSM-5 crystals are formed having a dimension up to about 5, 15, 20 or 30 μm.

The use of ODSO has the effect to produce ZSM-5 zeolites with improved crystallinity, in the range of about 1.2-1.8 (120-180% increase), for instance about 1.5 times (150%), as compared to ZSM-5 synthesized in the absence of ODSO (water only).

The use of ODSO has the effect to increase the production yield of ZSM-5 zeolite up to about 170 wt %, for example in the range of about 150-170 wt %, as compared to ZSM-5 synthesized in the absence of ODSO (water only).

In the process herein, one or more ODSO compounds are used in the synthesis of ZSM-5. The one or more ODSO compounds can include compounds of the general formulae R—SOO—SO—R', R—SOO—SOO—R', R—SO—SOO—OH, R—SOO—SOO—OH, R—SO—SO—OH, R—SOO—SO—OH, and mixtures thereof, where R and R' can be the same or different C1-C10 alkyl or C6-C10 aryl. In certain embodiments, the R and R' are methyl and/or ethyl groups. The one or more ODSO compounds used in the synthesis of ZSM-5 generally include ODSO compounds having 3 or more oxygen atoms. In certain embodiments, one or more ODSO compounds used in the synthesis of ZSM-5 include ODSO compounds having 1 to 20 carbon atoms. In certain embodiments, one or more ODSO compounds used in the synthesis of ZSM-5 include ODSO compounds having an average density greater than about 1.0 g/cc. In certain embodiments, one or more ODSO compounds used in the synthesis of ZSM-5 include ODSO compounds having an average boiling point greater than about 80° C.

In certain embodiments ODSO compounds used in the synthesis of ZSM-5 comprise all or a portion of water-soluble ODSO compounds contained in an oxidation effluent stream that is obtained by oxidation of DSO compounds from a MEROX process, as disclosed in U.S. Pat. Nos. 10,807,947 and 10,781,168 and as incorporated herein by reference above. Table 2 identifies certain water-soluble ODSO compounds that are formed by oxidation of DSO obtained from MEROX by-products.

TABLE 2

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | $H_3C-\overset{\overset{\displaystyle O}{\|}}{\underset{\underset{\displaystyle O}{\|}}{S}}-\overset{\displaystyle O}{\underset{\displaystyle \diagdown CH_3}{\diagup\!\!\!\diagup}}S$ 1,2-Dimethyldisulfane 1,1,2-trioxide |

TABLE 2-continued

| ODSO Name | Formula | Structure Examples |
|---|---|---|
| Dialkyl-disulfone Or 1,2 alkyl-alkyl-disulfane 1,1,2,2-tetraoxide | (R—SOO—SOO—R') | 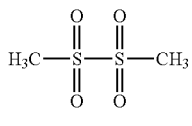<br>1,2-Dimethyldisulfane 1,1,2,2-tetraoxide |
| Alkyl-sulfoxidesulfonate | (R—SO—SOO—OH) | 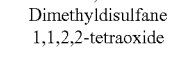<br>Methylsulfanesulfonic acid oxide |
| Alkyl-sulfonesulfonate | (R—SOO—SOO—OH) | 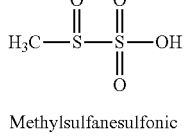<br>1-Hydroxy-2-methyldisulfane 1,1,2,2-tetraoxide |
| Alkyl-sulfoxidesulfinate | (R—SO—SO—OH) | 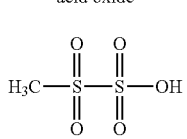<br>1-Hydroxy-2-methyldisulfane 1,2-dioxide |
| Alkyl-sulfonesulfinate | (R—SOO—SO—OH) | 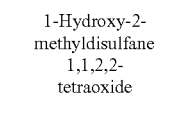<br>Methylsulfanesulfinic acid dioxide |

R and R' can be the same or different alkyl groups comprising C1-C10 alkyl or C6-C10 aryl.

In certain embodiments, the ODSO compounds are contained in a mixture from oxidation of DSO compounds, comprising alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH), for example, similar to those obtained as "Composition 2" in U.S. Pat. No. 10,781, 168 as incorporated herein by reference above.

The below examples and data are exemplary. It is to be understood that other aluminum sources, silica sources, bases and structure directing agents can be used as compared to the example.

In the synthesis steps for producing ZSM-5 herein, the sequence of adding the components is described above, but can be varied. In certain embodiments, the aluminum source, the alkali metal source and the structure directing agent are formed into an aqueous solution, to which the ODSO is added, and then the silica, since addition of the silica source forms a thick gel. In other embodiments, the ODSO can be added to the silica source, and that mixture is added to an aqueous solution of the aluminum source, the alkali metal source and the structure directing agent.

The temperature and pressure conditions, and residence time, for the mixing steps described herein to produce the intermediate suspension of precipitate in the supernatant that is used for producing MFI framework (ZSM-5) zeolite are similar to those used in typical ZSM-5 synthesis, for example, where the sol-gel is prepared at ambient temperature and pressure (for instance about 20° C. and about 1 standard atmosphere). The mixing time is sufficient to realize a homogeneous distribution of the sol-gel components. In certain embodiments the sol-gel can be aged before being subjected to subsequent hydrothermal treatment, for example for a period of about 0-24, 0-5, 0.5-24 orf 0.5-5 hours. Hydrothermal treatment is then carried out at a temperature in the range of about 100-180° C. and at atmospheric or autogenous pressure, and for a time period within the range of about 3 hours to 5 days.

The products are washed, for example with water at a suitable quantity, for example at about twice the volume of the sol-gel solution. The wash can be at a temperature of from about 20-80° C. at atmospheric pressure or under vacuum. The wash can continue until the pH of the filtrate approaches 7. The solids are recovered by filtration, for instance, using known techniques such as centrifugation, gravity, vacuum filtration, filter press, or rotary drums, and dried, for example at a temperature of up to about 110 or 150° C.

The conditions for calcination to produce MFI framework (ZSM-5) zeolite herein can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

EXAMPLES

Comparative Example 1

Aluminum nitrate nonahydrate (0.2633 g) was weighed into a Teflon liner (45 ml). Thereafter, 0.7750 g of a 50 wt. % sodium hydroxide solution and 7.0469 g tetrapropylammonium hydroxide (TPAOH) were added and the mixture stirred. Next, distilled water (3.3005 g) was added and the mixture was maintained under stirring. Finally, the silica source, 5.2430 g of Ludox AS-50, $SiO_2$ content of 40 wt. %, was added and the mixture stirred until homogeneous.

The Teflon liner was positioned within an autoclave and transferred to an oven and heated to a temperature of 175° C. whilst rotating the autoclave. The autoclave was maintained at isothermal conditions for 18 hours.

The product was filtered and washed with distilled water before drying at 110° C. The dry mass was 1.3906 g. The inorganic content determined by thermogravimetric (TGA) analysis was 87.78%. Hence, a product (zeolite) yield of 1.2207 g was obtained.

The as-made sample from Comparative Example 1 was calcined at 550° C. (1° C./min ramp rate) for 8 hours to realize a porous ZSM-5 zeolite.

Example 1

Aluminum nitrate nonahydrate (0.2609 g) was weighed into a Teflon liner (45 ml). Thereafter, 0.7502 g of a 50 wt. % sodium hydroxide solution and 7.0361 g tetrapropylammonium hydroxide (TPAOH) were added and the mixture stirred. Next, distillated water (1.5546 g) and ODSO (1.7545 g) were added and the mixture was maintained under stirring. The ODSO used in this example are those obtained as "Composition 2" in U.S. Pat. No. 10,781,168, incorporated herein by reference above. Finally, the silica source, 5.2325 g of Ludox AS-50, $SiO_2$ content of 40 wt. %, was added and the mixture stirred until homogeneous.

The Teflon liner was positioned within an autoclave and transferred to an oven and heated to a temperature of 175° C. whilst rotating the autoclave. The autoclave was maintained at isothermal conditions for 18 hours.

Thereafter, the product was filtered and washed with distilled water before drying at 110° C. The dry mass was 2.3206 g. The inorganic content determined by thermogravimetric (TGA) analysis was 87.74%. Hence, a zeolite yield of 2.0361 g was obtained.

Example 2

Aluminum nitrate nonahydrate (0.2601 g) was weighed into a Teflon liner (45 ml). Thereafter, 0.7455 g of a 50 wt. % sodium hydroxide solution and 7.0196 g tetrapropylammonium hydroxide (TPAOH) were added and the mixture stirred. Next, distilled water (1.4826 g) and ODSO (1.7905 g) were added and the mixture was maintained under stirring. Finally, the silica source, 5.5561 g of Ludox AS-50, SiO2 content of 40 wt. %, was added and the mixture stirred until homogeneous.

The Teflon liner was positioned within an autoclave and transferred to an oven and heated to a temperature of 175° C. whilst rotating the autoclave. The autoclave was maintained at isothermal conditions for 18 hours.

Thereafter, the product was filtered and washed with distilled water before drying at 110° C. The dry mass was 2.3387 g. The inorganic content determined by thermogravimetric (TGA) analysis was 88.32%. Hence, a zeolite yield of 2.0655 g was obtained.

The as-made samples from Examples 1 and 2 were calcined at 550° C. (1° C./min ramp rate) for 8 hours to realize porous ZSM-5 zeolite having MFI framework.

Figure 2:
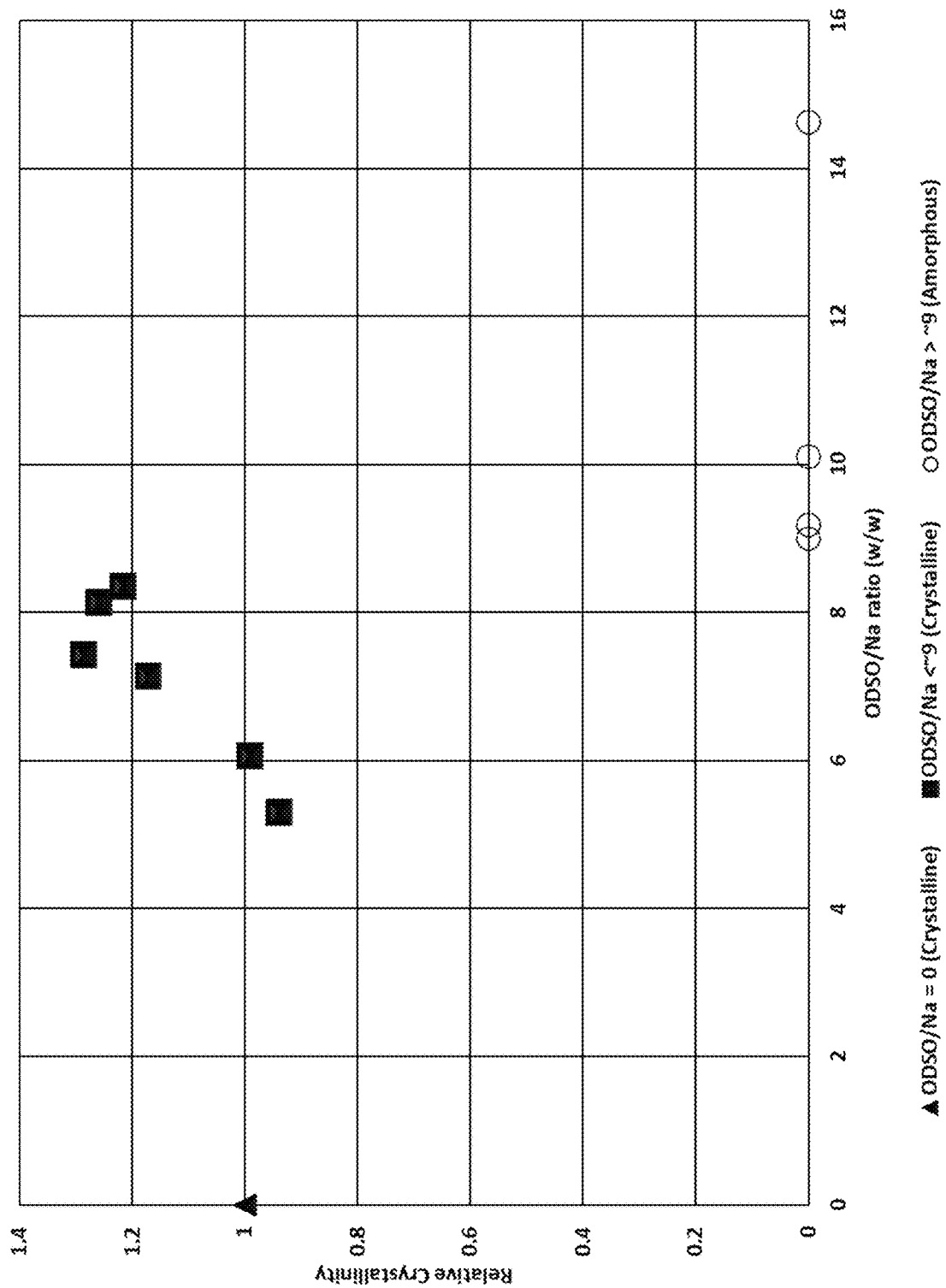
FIG. 2 is a plot of relative crystallinity as a function of ODSO/Na ratios, indicating crystalline or amorphous material.

FIG. 1 shows the x-ray diffraction patterns of the calcined zeolites from Examples 1 and 2 and the comparative example. All diffractograms show that ZSM-5 (MFI) has been produced, however, the peak intensities are clearly observed to be different. For the ZSM-5 zeolite synthesized in water only, the peak intensity is lower than that of the ZSM-5 zeolite synthesized when the ODSO/Na mass ratios are 8.14 and 8.36. When normalizing the degree of crystallinity, this is based on the peak intensity of the (051) peak reflection for the calcined ZSM-5 zeolite synthesized in water only. For the ZSM-5 zeolites synthesized using ODSO/Na mass ratios of 8.14 and 8.36, the relative crystallinity is approx. 1.26 and 1.21 times higher, respectively (Table 3, FIG. 2).

Figure 3:
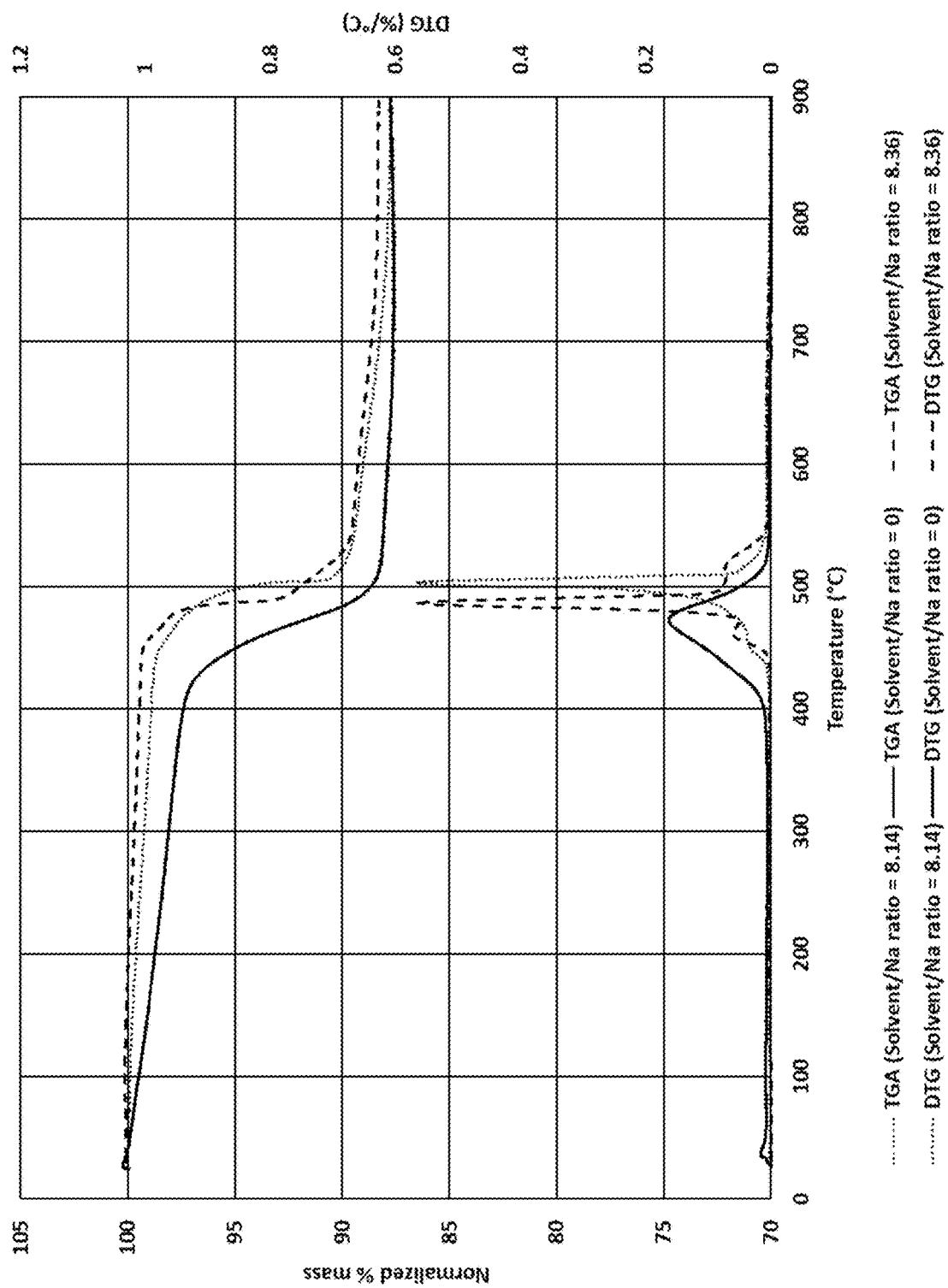
FIG. 3 is a plot of thermogravimetric (TGA) and derivative thermogravimetric (DTG) mass loss profiles of the ZSM-5 zeolites synthesized in the presence of ODSO and water as in Examples 1-2 and the ZSM-5 zeolite of comparative Example 1 synthesized in the absence of ODSO (water only)
Figure 4:
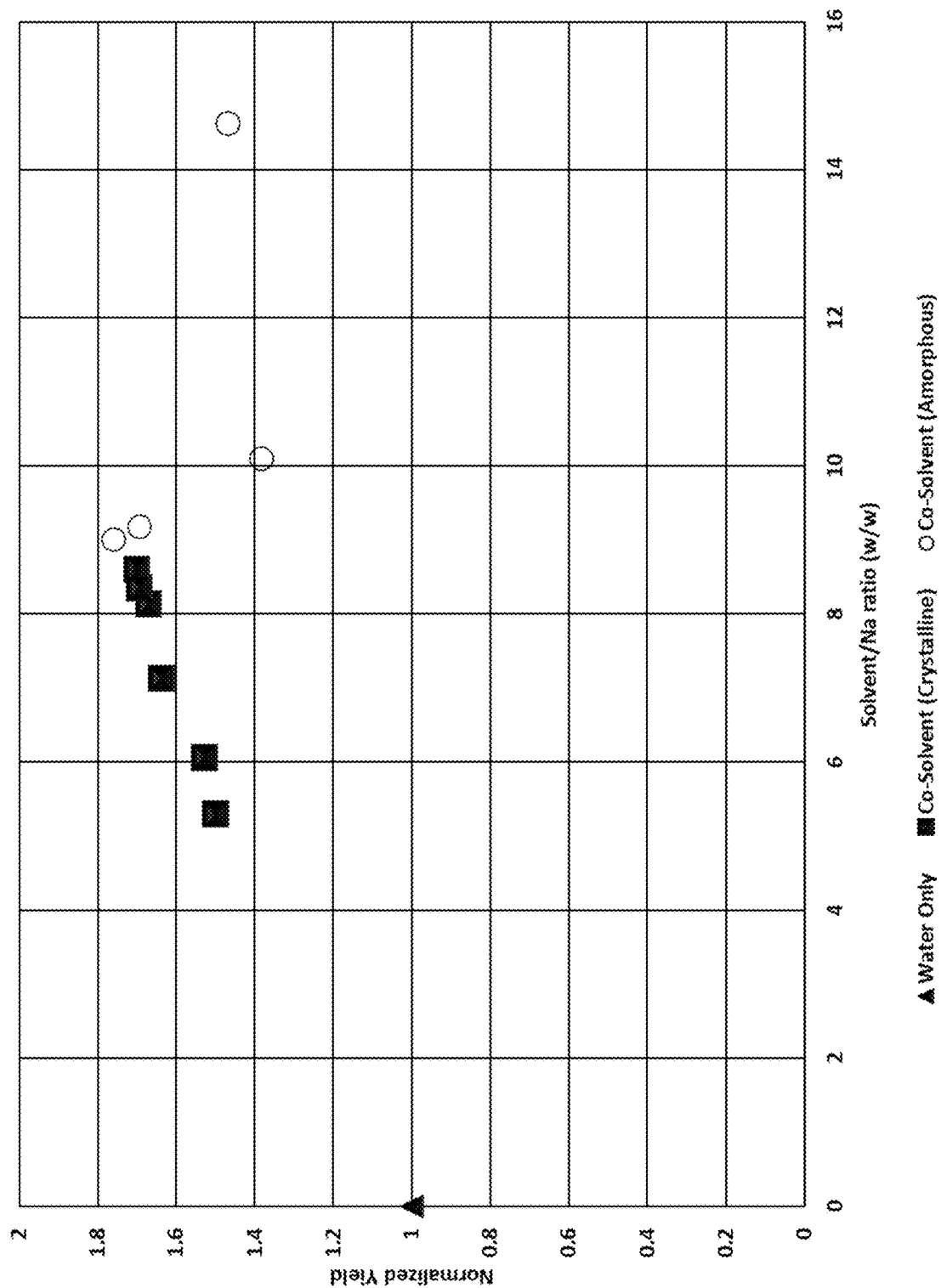
FIG. 4 is a plot of normalized yield as a function of ODSO/Na ratios, indicating crystalline or amorphous material.

Additionally, the zeolite yield is increased as a function of increasing the ODSO/Na mass ratio for crystalline materials. Zeolite yield is calculated based on the dry-mass of the as-made zeolite multiplied by the percentage of inorganic content determined from thermogravimetric analysis (FIG. 3, FIG. 4 and Table 4).

Figure 5:
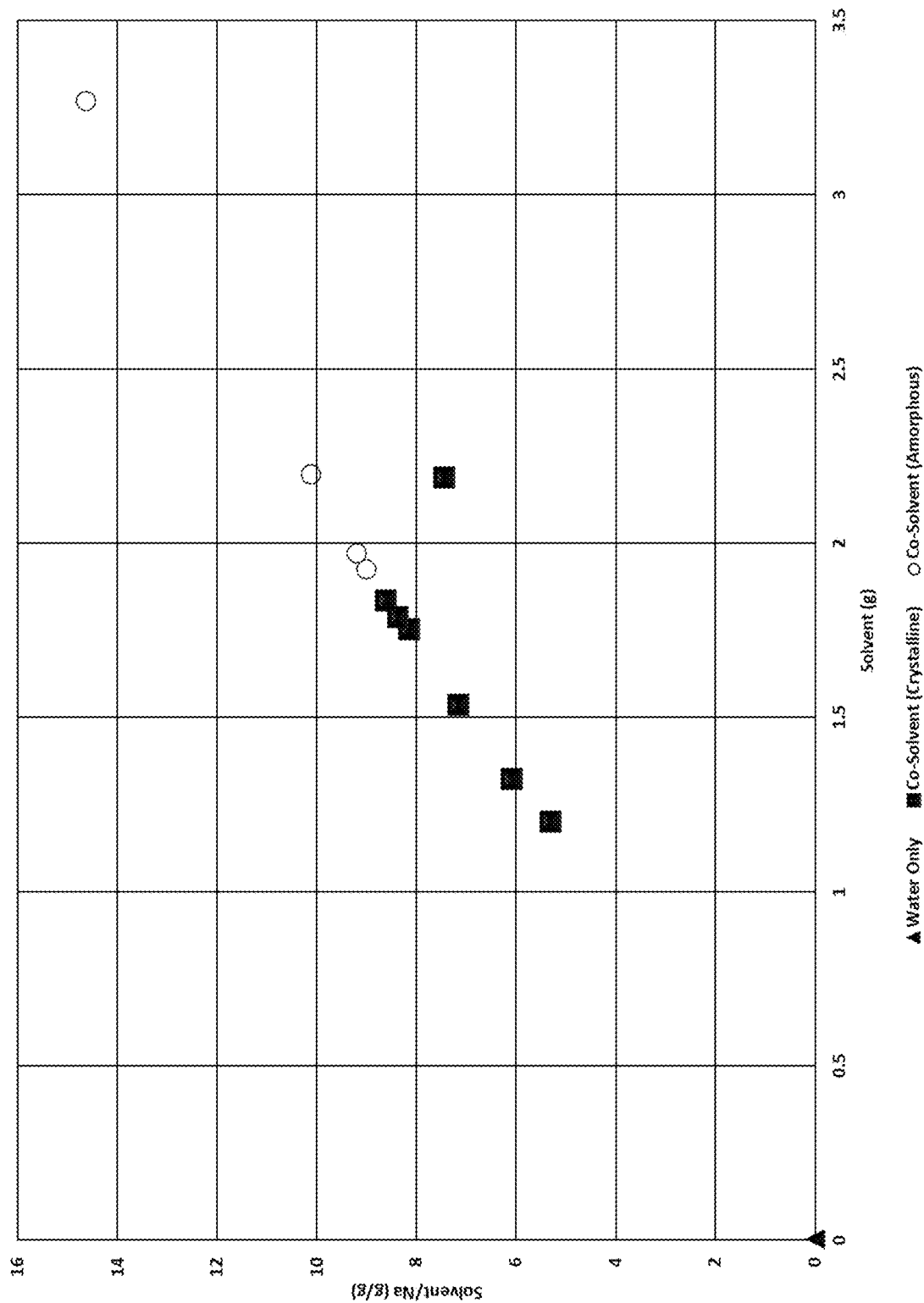
FIG. 5 is a plot of ODSO/Na ratios against ODSO mass demonstrating transition between crystalline products and amorphous products.

FIG. 5 shows the transition between crystalline products and amorphous products as a function of the ODSO/Na mass ratio; with the proportions of alumina and silica, the ODSO/Na mass ratio of less than about 9 produces crystalline material whereas higher ratios produce amorphous material ASA.

Figure 6:
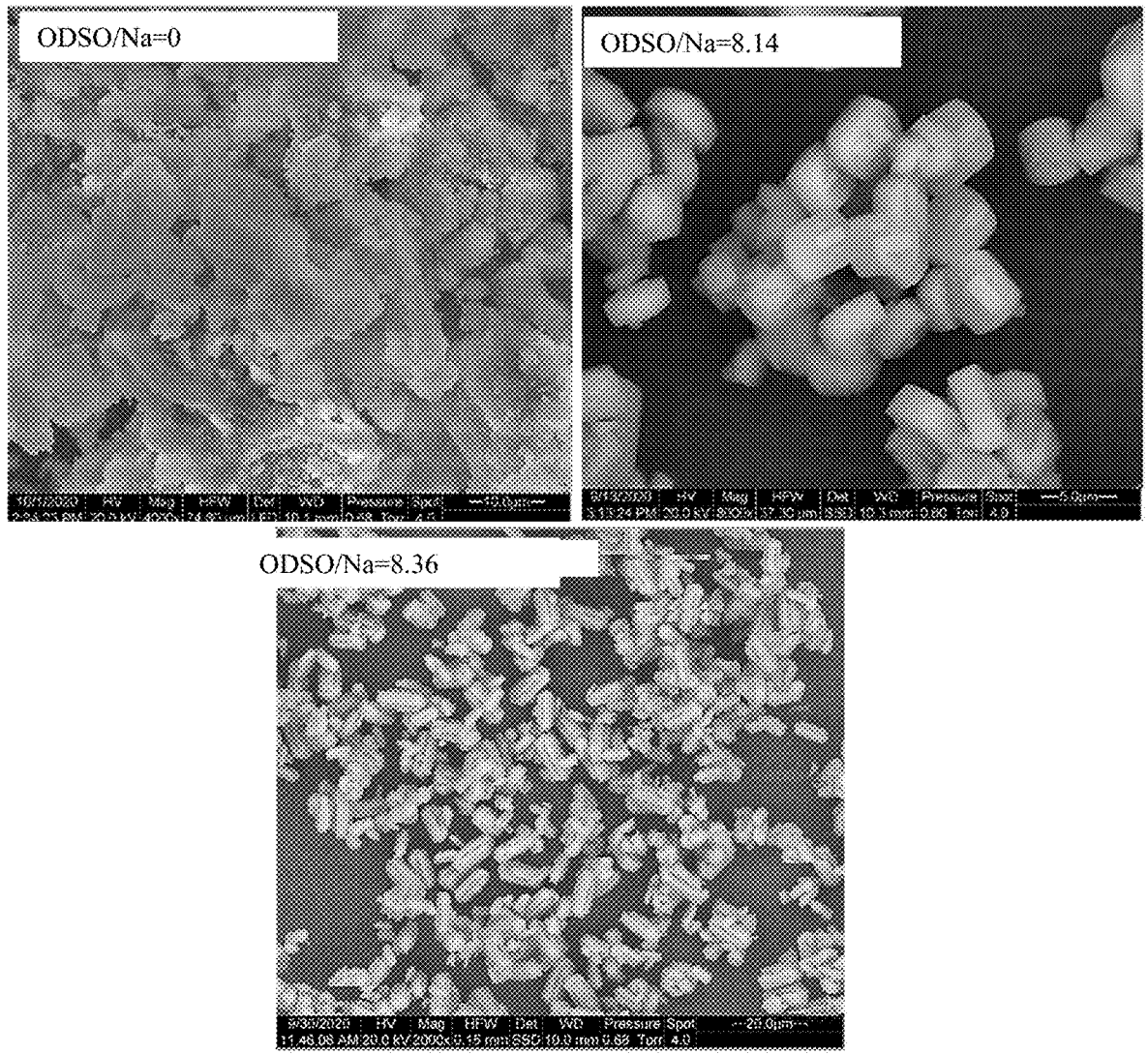
FIG. 6 shows scanning electron microscopy images of the ZSM-5 zeolites synthesized in the presence of ODSO and water, and the ZSM-5 zeolite of comparative Example 1 synthesized in the absence of ODSO (water only)
Figure 7:
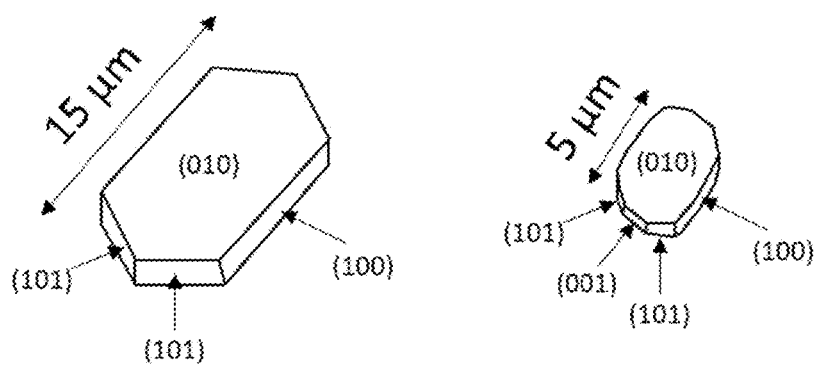
FIG. 7 are diagrams representative of the crystallographic nature of the ZSM-5 zeolites synthesized in the presence of ODSO and water as in Examples 1-2.

The morphology of the zeolite is also observed to change as a function of the ODSO/Na mass ratio (FIG. 6). For the ZSM-5 zeolite synthesized in water only the morphology is not so well defined. Increasing the ODSO/Na mass ratio to 8.14 shows a dramatic change to the morphology of a type of twinned octagonal crystals in the region of 5 µm. The crystals appear to be consistent with respect to their relative dimensions and also there appears to be a high ratio between the (001) and (101) planes to give the impression of a curved surface at opposing ends. The (100) plane appears to be the largest side of the crystal, however, the length-to-diameter ratio is close to 1 (see FIG. 7 for structural information).

However, further increasing the ODSO/Na mass ratio to 8.36 results in further changes to the crystal morphology. The first observation is that of larger crystals, in the region of 15 µm, hence, three times that of the ZSM-5 crystals produced for an ODSO/Na mass ratio of 8.14. The second observation is epitaxial growth along the (100) plane resulting in a length-to-diameter of approx. 2.5. The third observation is that the opposing ends are no longer curved but pointed as a result of the dominant (101) planes over that of the (001) plane.

The data obtained shows that a higher yield of ZSM-5 can be obtained when synthesized in the presence of an effective quantity of ODSO and that the said ZSM-5 is more crystalline with tuned and well-defined morphology.

TABLE 3

Relative crystallinity of the calcined ZSM-5 as a function of the ODSO/Na ratio.

| ODSO/Na Ratio (w/w) | Relative Crystallinity |
|---|---|
| 0 | 1.00 |
| 8.14 | 1.26 |
| 8.36 | 1.21 |

Relative crystallinity based on peak intensity of the (051) peak reflection at approx. 26.9° (2θ). An ODSO/Na ratio = 0 is a water-only synthesis in the absence of ODSO.

TABLE 4

Normalized zeolite yield as a function of the ODSO/Na ratio.

| ODSO/Na Ratio (w/w) | Normalized Yield |
|---|---|
| 0 | 1.00 |
| 8.14 | 1.67 |
| 8.36 | 1.69 |

Normalized zeolite yield is based on the dry mass of the as-made zeolite multiplied by the inorganic content determined from thermogravimetric analysis. An ODSO/Na ratio = 0 is a water-only synthesis in the absence of ODSO.

The methods and compositions of the present invention have been described above and in the attached drawings; however, modifications will be apparent to those of ordinary skill in the art and the scope of protection for the invention is to be defined by the claims that follow.

The invention claimed is:

1. A method for the preparation of a zeolite having MFI framework comprising:

forming a homogeneous aqueous mixture of water soluble oxidized disulfide oil (ODSO), a silica source, an aluminum source, an alkali metal source, and a structure directing agent;

heating the homogeneous aqueous mixture under conditions and for a time effective to form a crystalline zeolite as precipitate suspended in a supernatant as an intermediate suspension;

recovering the precipitate from the intermediate suspension; and calcining the recovered precipitate is calcined at a suitable temperature, temperature ramp rate and for a suitable period of time at to realize porous MFI framework zeolite.

2. The method of claim 1, wherein the intermediate suspension has a pH of greater than about 9.

3. The method of claim 1, wherein the alkali metal source is sodium and the mass ratio of ODSO to sodium is less than about 9.

4. The method of claim 1, wherein the recovered porous MFI framework zeolite has a silica-to-alumina ratio in the range of about 20-1500.

5. The method as in claim 1, wherein the aluminum source comprises aluminates, alumina, other zeolites, aluminum colloids, boehmites, pseudo-boehmites, aluminum hydroxides, aluminum salts, aluminum alkoxides or alumina gels.

6. The method as in claim 1, wherein the silica source comprises sodium silicate (water glass), fumed silica, precipitated silica, colloidal silica, silica gels, zeolites, dealuminated zeolites, silicon hydroxides or silicon alkoxides.

7. The method as in claim 1, wherein the structure directing agent comprises quaternary ammonium cation compounds, bifunctional dicationic molecules containing a long aliphatic chain, dual-porogenic surfactants, silylated polyethylenimine polymers, amphiphilic organosilanes, or hydrophilic cationic polyelectroyltes/polymers.

8. The method as in claim 7, wherein the structure directing agent comprises quaternary ammonium cation compounds selected from the group consisting of tetramethylammonium (TMA) cation compounds, tetraethylammonium (TEA) cation compounds, tetrapropylammonium (TPA) cation compounds, tetrabutylammonium (TBA) cation compounds, cetyltrimethylammonium (CTA) cation compounds and combinations thereof.

9. The method as in claim 7, wherein the structure directing agent comprises bifunctional dicationic molecules selected from the group consisting of $C_{22-6-6}$, $C_{22-6-3}$, and poly(ethylene glycol).

10. The method of claim 1, wherein the ODSO comprises ODSO compounds having 3 or more oxygen atoms.

11. The method of claim 1, wherein the ODSO comprises ODSO compounds having 1 to 20 carbon atoms.

12. The method of claim 1, wherein the ODSO has an average density greater than about 1.0 g/cc.

13. The method of claim 1, wherein the ODSO has an average boiling point greater than about 80° C.

14. The method of claim 1, wherein the ODSO comprises ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' can be the same or different C1-C10 alkyl or C6-C10 aryl.

15. The method of claim 1, wherein the homogeneous aqueous mixture is formed by:
providing the silica source; and
combining with the silica source
the aluminum source, the alkali metal source, and the structure directing agent; and
the water soluble ODSO;
wherein the water soluble ODSO is added after the aluminum source, the alkali metal source, and the structure directing agent; or wherein the water soluble ODSO is first combined with the aluminum source, the alkali metal source and the structure directing agent, and then combined with the silica source; and
wherein an effective quantity of water for the homogeneous aqueous mixture is provided by using a water-containing silica source, and/or by using an aqueous mixture of the aluminum source, the alkali metal source and the structure directing agent.

16. The method of claim 1, wherein the homogeneous aqueous mixture is formed by:
providing the aluminum source, the alkali metal source and the structure directing agent as a first mixture; and
combining the first mixture with the silica source and the water soluble ODSO;
wherein the water soluble ODSO is added after the silica source; or wherein the water soluble ODSO is first combined with the silica source, and then combined with the first mixture,
wherein an effective quantity of water for the homogeneous aqueous mixture is provided by using a water-containing silica source, and/or by using an aqueous mixture of the aluminum source, the alkali metal source and the structure directing agent.

17. The method of claim 1, wherein the homogeneous aqueous mixture is formed by:
combining the water soluble ODSO with the silica source to form a first mixture; and
combining the first mixture with the aluminum source, alkali metal source and the structure directing agent;
wherein an effective quantity of water for the homogeneous aqueous mixture is provided by using a water-containing silica source, and/or by using an aqueous mixture of the aluminum source, the alkali metal source and the structure directing agent.

18. The method of claim 1, wherein the homogeneous aqueous mixture is formed by:
combining the water soluble ODSO with the aluminum source, the alkali metal source and the structure directing agent to form a first mixture; and
combining the first mixture with the silica source;
wherein an effective quantity of water for the homogeneous aqueous mixture is provided by using a water-containing silica source, and/or by using an aqueous mixture of the aluminum source, the alkali metal source and the structure directing agent.

19. The method of claim 1, wherein an effective quantity of water for the homogeneous aqueous mixture is provided by using a water-containing silica source, and/or by using an aqueous mixture of the aluminum source, the alkali metal source and the structure directing agent.

* * * * *